May 10, 1932. J. RENDELMAN 1,857,606
RADIATOR FILTER
Filed Dec. 5, 1928 2 Sheets-Sheet 1
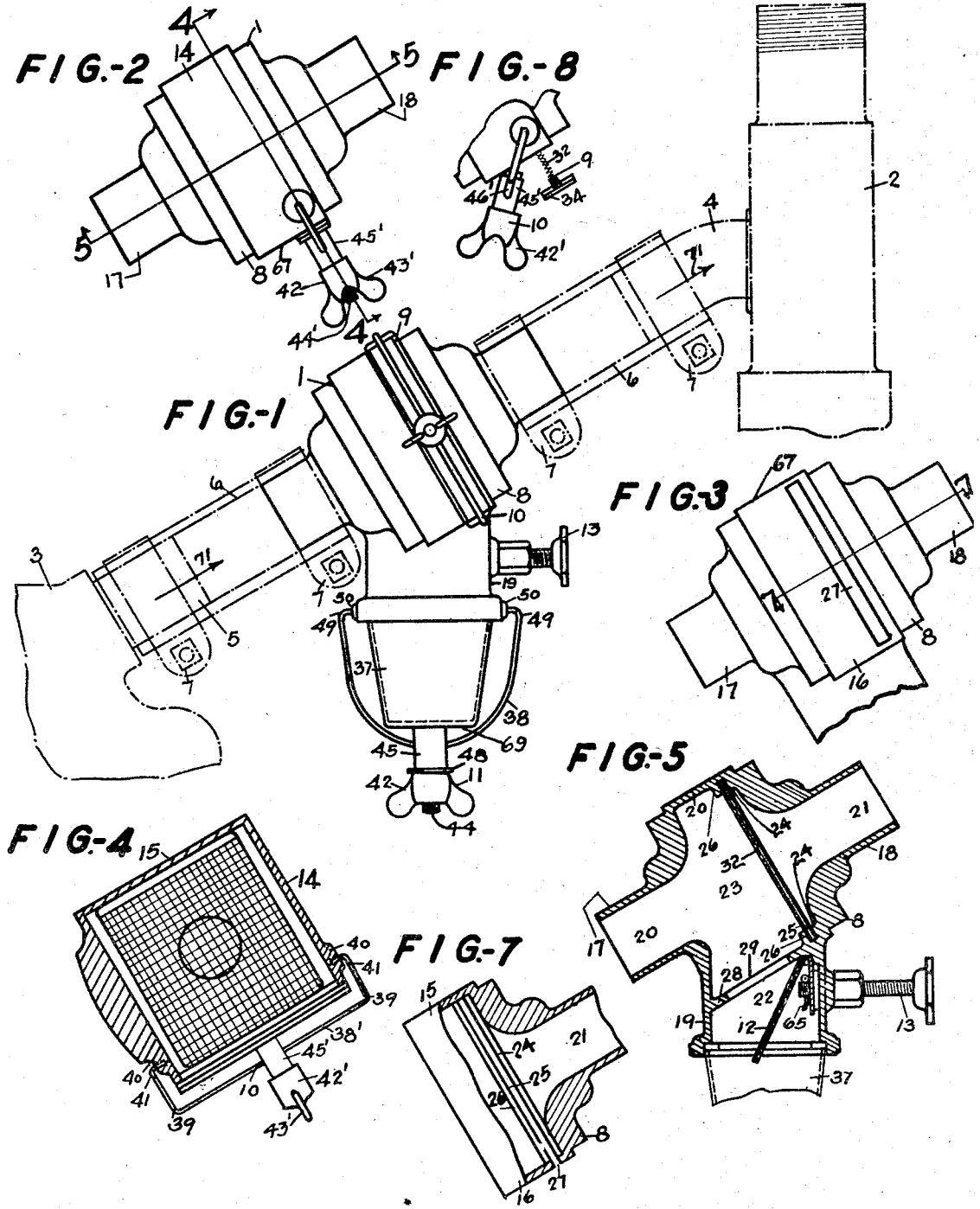
INVENTOR.
JOSEPH RENDELMAN
BY
*A. D. Casser*
ATTORNEYS.

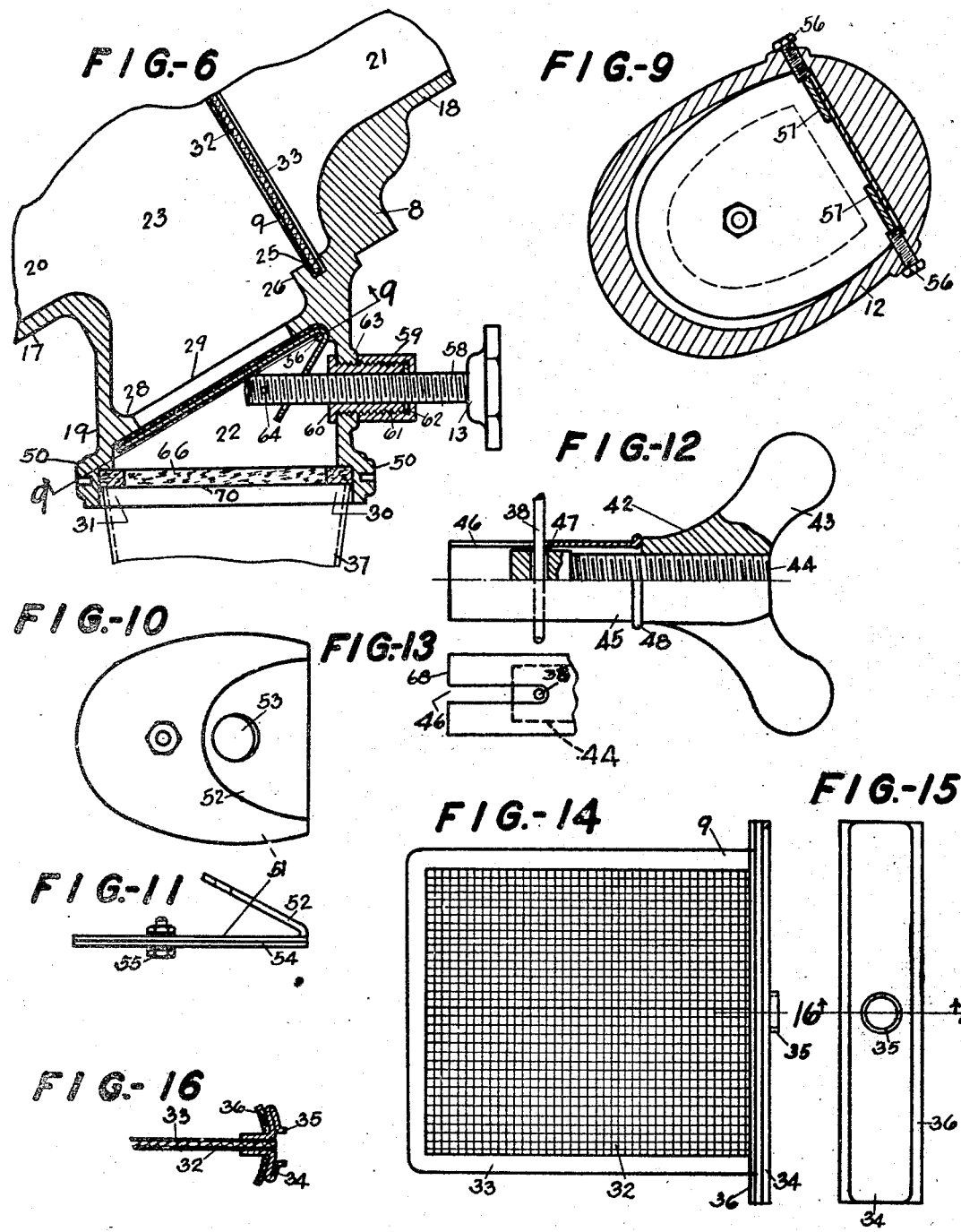

Patented May 10, 1932

1,857,606

UNITED STATES PATENT OFFICE

JOSEPH RENDELMAN, OF PHILADELPHIA COUNTY, PENNSYLVANIA

RADIATOR FILTER

Application filed December 5, 1928. Serial No. 323,988.

This invention relates to filtering devices for fluids used in automotive vehicles and has for its object the provision of a filtering device which shall be simple in construction, easy to manufacture and assemble and which shall be easily installed and incorporated in the fluid system.

As is known, fluids used in automotive vehicles, and especially those used for cooling the engine in what is commonly known as the radiator system, are forced through the system by means of pumps. These cause the fluid to continually circulate in the well known manner and results in a cooling effect on the engine. In its course through the system through which it is forced, the fluid picks up and carries along particles of dust, dirt and rust. These clog the system in whole or in part with a resulting loss in the efficiency of the device. To remedy this defect in the fluid system this invention has been designed.

More particularly stated one of the objects of this invention is to provide a filter device which shall be easy to manufacture.

Another object of my device is to provide a filter device which shall be easy to assemble.

Another object of my invention is to provide a filter device which shall be easy to install and incorporate into the fluid system.

Another object of my invention is to provide a filter device with a removable means whereby the dirt, dust, rust or other foreign substance impounded by the filter device may be periodically removed.

Another object of my invention is to provide a filter device whereby the dirt, dust, rust or other foreign substance collected as a result of the filter device may be periodically removed.

Another object of my invention is to provide a filter device having as elements a filter element and an element for the reception of dirt, dust, rust or other foreign substance collected or impounded through the agency of the said filter element wherein the filter element may be removed without it being at the same time necessary to remove the collecting element for the dirt, dust, rust or other foreign substance.

Another object of this invention is to provide a filter device with a receiver for dirt, dust, rust or other foreign substance impounded or collected by the filter device.

Another object of this invention is to provide a filter device with a valve whereby temporary or permanent removal of the receiver for the dirt, dust, rust or other foreign substance collected or impounded by the filter device will not interfere with the operation of the fluid system.

Another object of this invention is to provide a filter device with a valve whereby temporary or permanent removal of the receiver for the dirt, dust, rust or other foreign substance collected or impounded by the filter device will not result in any appreciable loss of fluid in the system.

Another object of this invention is to provide a filter device with a valve whereby the use of a container for the receipt of the dust, dirt, rust or other foreign substance collected or impounded by the filter device may be obviated if desired.

Another object of this invention is to provide a filter device with a valve whereby it will be possible to operate the fluid system in the event of the loss, breakage or damage of any sort to the receiver for the dirt, dust, rust or other foreign substance.

With the various objects of the present invention both singly and collectively in view, the invention consists, primarily in the novel filter device hereinafter more fully set forth; and, the invention consists furthermore in the novel elements hereinafter set forth; and, the invention consists furthermore in the novel arrangements and combinations and subcombinations of the various devices and parts, as well as the details of construction of the said parts, all of which will be more fully described in the following specification and then finally embodied in the clauses of the claims which are appended to and which form an essential part of the said specification.

The invention is illustrated in the accompanying drawings in which:—

Figure 1 is a side view showing the filter device connected in the fluid cooling system of an automatic vehicle, the connecting elements and the well known automotive elements such as the engine and radiator being shown in dotted lines.

Figure 2 is a top view showing the filter device as a unit, with the filter element locking device in the closed position.

Figure 3 is a side view of the upper part of the casing with the filter element removed. The lower portion of the casing is shown as broken off and the part containing the valve portion is entirely omitted.

Figure 4 is a section on the line 4—4 of Figure 2.

Figure 5 is a section on the line 5—5 of Figure 2, showing the valve in the open position, and showing all parts in section with the exception of the valve closing device.

Figure 6 is an enlarged partial section taken similarly to Figure 5, but showing the valve in the closed position.

Figure 7 is a partial section taken along the line 7—7 of Figure 3.

Figure 8 is a partial top view of the filter device showing the filter element locking device in the open position and the filter element partly removed from the filter device.

Figure 9 is a section on the line 9—9 of Figure 6.

Figure 10 is a top view of the valve element as a unit.

Figure 11 is a side view of the same.

Figure 12 is a view partly in section of an element of the lacking unit.

Figure 13 is a partial top view of the element shown in Figure 13.

Figure 14 is a side view of the filter unit.

Figure 15 is a front view of the same.

Figure 16 is a partial section on the line 16—16 of Figure 15.

Referring more particularly to the drawings, wherein similar reference numerals denote similar parts, reference numeral 1 denotes the filter device as a whole which is adapted to be connected to the outlet pipe 4 of the radiator 2 and to the outlet 5 of the engine 3 by means of the connecting tubes 6, clamped firmly in place by the clamps 7.

The filter device consists of a hollow casing 8, a filter element 9, a filter locking element 10, a dirt, dust, rust or other foreign substance receptacle 37, a receptacle locking element 11, a valve 12 and a valve locking element 13.

The hollow casing 8 has a central element 67 and two tubular arms 17 and 18. The central element 67 houses the filter element 9 and the valve member 12. The two tubular arms 17 and 18 serve as connecting elements to each which is attached to one of the ends of the tubes 6 which join the filter device to the engine and radiator.

The central element 67 is composed of a top wall 14, a rear wall 15, a front wall 16 and a projecting tubular member 19. The walls 14, 15 and 16 combine to bound and form the chamber 23 which houses the filter element 9. The tubular member 19 forms the housing for the valve 12 and also serves as a point of attachment for the dirt, dust and rust receiving member 37. Extending from the upper wall 20 of the chamber 23 and the upper portion of the tubular member 19 are the lugs 26. These are spaced from and are parallel to the shoulders 24 provided in the wall 20 and the member 19. Each lug 26 cooperates with the adjacent shoulder 24 to form a slot 25 which serves both as a guide for the insertion of the filter element 9 and also for holding the same against lateral displacement due to the force of the moving fluid. A slot 27 is provided in the wall 16 to permit the insertion and removal of the filter element 9 into and out of the chamber 23.

The filter element 9 is composed of a screen 32, which serves as the filter material to catch and impound the dust, dirt, rust and other foreign matter carried by the fluid; a casing 33 and a front sheet 34 for firmly holding the filter material in place; a tubular member 35 carried by the sheet 34 which is adapted to co-operate with the element 45' of the filter element locking device 10 to lock the same; and a gasket 36 which serves to prevent any leakage through the slot 27 of the fluid in the system.

The filter locking device 10, which firmly locks the filter device in place, is, except for certain details of structure due to position, similar in purpose and principles of construction to the receptacle locking device. For these reasons these two elements will be here described together.

The filter locking device 10 is composed of a member 38', which is similar to and the equivalent of member 38 of the receptacle locking device 11, and a member 42', which is similar to and the equivalent of the member 42 of the receptacle locking device 11. The member 38' of the filter locking device 10 has arms 39 and 41. The arms 41 are mounted in bosses 40 on the central element 67 of the casing 1. The member 38 of the receptacle locking device 11 has arm 49 which is mounted in bosses 50 on the tubular member 19. The member 38 of the receptacle locking device 11 extends through a hole 47 in the screw 44 of the member 42, thus serving to attach the member 42 to the member 38. The member 38' of the filter locking device extends through a similar hole in the element 44' of the member 42' which is exactly similar to and the equivalent of the member 44 of the member 42'. The member 42 of the receptacle locking device 11 is composed of a screw 44, a slidable collar 45 carried by the screw 44 and a nut 43 adapted to actuate and lock the said collar 45 in place. The collar 45 has a slot 46 therein and is mounted on the screw 44 in such a manner that the element 38 extends through the slot 46 thus locking the collar against rotary motion on the screw 44 while permitting vertical motion. The collar 45 has its end 48 enlarged whereby better bearing surface is given to the screw 44. The member 42' of the filter locking device 10, is similar in principle and general construction to the element 42 of the receptacle locking device 11, the member 43' being similar to and the equivalent of the member 43, the member 45' being generally similar to and the equivalent of the element 45 and the element 44' being similar to and the equivalent of the element 44. The element 45' differs from the element 45 in the fact that the element 45' does not have an enlarged end 48.

The tubular member 19 has a chamber 22 which meets the chamber 23 in the central element 67. Formed within the chamber 22 and carried by the walls of the member 19 is an annular flange 28 having the opening 29 therein. The member 19 is indented at its lower end 30 forming a flange 31. A gasket 66 bears against the flange 31. The top 70 of the receptacle 37 for receiving the dirt, dust, rust and other foreign substances impounded by or filtered by the filter element 9 bears against the gasket 66. The receptacle 37 is held in position by the end 68 of the member 45 of the receptacle locking device 11 which bears against the bottom 69 of the element 37.

The valve 12 is composed of a closure element or cap 51, a gasket 54 held firmly on the cap 51 by the screw, nut and washer unit 55. The cap 51 has a flange 52 which has a hole 53 therein. The hole 53 is of a size sufficient to permit the screw 58 of the valve locking device to move freely therethrough at all times. The cap 51 is movably mounted on the studs 57 of the screw 56 which are carried by the walls of the member 19. In its closed position the cap 51 bears against the inner flange 28.

The valve locking device 13 is composed of a screw 58 carried by the member 60 of the stuffing box 59. The stuffing box 59 is composed of the member 60 threadably carried by the member 19 at the point 63, a member 61 threadably mounted on the member 60 and a gasket 62. The screw 58 has a hole 64 therein in which is mounted the cotter pin 65. The cotter pin adapts the screw in its outward motion for positive contact with the flange 52 of the valve cap whereby positive pressure is applied to the valve for the purpose of opening the same.

The arms 17 and 18 are tubular in form and as shown form an integral part of the casing 1. Formed within the arms 17 and 18 are the cavities 20 and 21 which connect with the chamber 23. Each of the arms 17 and 18 are adapted to be attached to one of the ends of the tubes 6 which connect the filter device with the engine and radiator.

Although the functions of the device as a whole and the operation of its component parts is believed to be clear from the foregoing disclosure the following detailed description is appended for the purpose of obviating any possible misunderstanding.

The filter device herein shown can be used in any automotive fluid system. It is here shown in association with the liquid cooling system of an automobile commonly called the radiator. This is to be understood as for the purposes of illustration only and not by the way of limitation.

In an automobile liquid cooling system the liquid is forced to circulate through the engine and the radiator. The system which carries the fluid is herein designated "fluid system." The fluid is forced out of the top of the engine 3 through the pipe 5 through the pipe 4 and into the top of the radiator 2. The direction of flow is indicated by the arrows 7'. The cooling fluid then circulates downward through the radiator 2, enters the lower part of the engine at a point not shown, circulates through the engine to be forced out at the top, thus completing the circuit. As was previously stated in the course of this circulation, dust, dirt, rust and foreign substances are picked up by the water and carried with it.

For the purposes of removing these foreign substances from the system, the filter device 1 is inserted at a point in the line connecting the engine 3 with the radiator 2. One of the ends of each of the tubes 6 is connected to the arms 17 and 18 respectively of the filter device 1 and firmly secured thereto by the clamp 7. The other end of each of the connecting tubes 6 is connected to the pipes 4 and 5 respectively of the radiator 2 and the engine and firmly secured thereto by means of the clamps 7. The filter device 1 is now mounted for operative use. The normal operating position is shown in Figure 5 with the valve 12 open.

The fluid from the engine first enters the chamber 20 of the arm 17 and flows into the chamber 23 where it strikes the screen 32 of the filter element 9. The particles which are too big to go through the screen are stopped and the force of gravity carries them downward through the chamber 23 through the opening 29 into the chamber 22 and thence on downward into the receptacle 37. When it is desired to remove the receptacle 37 for the purposes of cleaning the same the screw 58 of the locking device 13 is rotated inwardly and contacts against the lower face of the valve cap 51. Continued rotation of the screw in the same direction forces the valve upwardly, finally causing the same to firmly contact with the inner flange 28 of the tubular member 19. The valve is now in a closed position shown in Figure 6 and the receptacle 37 is cut off from any connection with the fluid system. The nut 43 of the receptacle locking device 42 is now rotated in such a direction as to advance the same towards the outer end of the screw 44. This relieves the pressure on the collar 45 which gradually slides downwardly. When the collar 45 is slid downwardly a sufficient distance the element 38 may be rotated about its mounting point as a pivot and the receptacle 37 removed. The receptacle 37 may now be emptied of its contents and made ready for its insertion again into the system.

To replace the receptacle 37 and lock the same the above outlined steps are reversed. The receptacle 37 is placed in position with its end 70 contacting against the lower face of the gasket 66. The element 38 is now rotated downwardly to its operative position shown in Figure 1, the nut being rotated in the opposite direction to that hereinbefore stated and exerts pressure on the end 48 of the collar 45. The collar 45 slides upwardly along the screw 44 being guided in its position by the element 38 working in the slot 46. The end 68 of the member 45 contacts against the bottom 69 of the receptacle 37 forcing the top 70 of the receptacle 37 firmly against the gasket 66 thus locking the device. The valve 12 is now opened and the device ready for operation again as a unit.

It is to be noted that the removal of the receptacle 37 in no way interferes with the operation of the fluid system and therefore does not in any way interfere with the operation of the automotive device as a whole. This is made possible by the valve 12 which in its closed position cuts off entirely the chamber 22 and the foreign substance receptacle 37 and creates a closed system for the fluid. The fluid in this instance enters in the chamber 20 as hereinbefore outlined, goes through the chamber 23 and thence through the screen 32 of the filtering element 9, through the chamber 21 and then onward into the radiator 2. The valve 12 absolutely prevents any of the liquid from escaping into the chamber 22.

This structure results in many distinct advantages, the following of which are enumerated:

(1) It makes possible the easy removal and cleaning of the foreign substance receptacle 37 without any resultant wetting and dirtying of the hands or clothing of the operator.

(2) It makes possible the operation of the fluid system in the event of any damage or destruction to the receptacle 37. In the event of any damage to the receptacle 37 the valve 12 need merely be closed and the system will be still operated as a unit. Any dirt, dust, rust or foreign substance which may accumulate in that time can lodge in the lower portion of the chamber 23 immediately above the flange 38.

(3) It makes possible, with the entire omission of the removable receptacle, for the reception of dirt, dust, rust and other foreign substance compounded or collected by the screen 32 of the filtering element 9 in either one of the following two manners:

(a) By closing the valve 12 any dirt, dust, rust or other foreign substance impounded would collect in the lower portion of the chamber 23 immediately above the flange 28.

(b) By extending the walls of the tubular member 19 downward and the provision of a second valve a chamber would be formed between the first valve and the second valve. This chamber can be substituted for the receptacle 37. In the normal operative position of this device the valve 12 would be in the position shown in Figure 5 and the second similar valve would at the same time be in a closed position similar to that shown for the valve 12 in Figure 6. To clean the device and remove the dirt collected it is only necessary to close the upper valve 12 and open the lower valve and then to remove the dirt.

To open the valve 12 the screw 58 of the valve locking member 13 is rotated downwardly. As was previously stated the valve is rotatably mounted on the studs 57 of the screws 56 and the hole 53 in the flange 52 of the valve cap 51 is large enough to permit the valve to at all times swing free of the screw 58. Rotation of the screw 58 therefore in a downward direction would result in the cap 51 of the valve 12 dropping downwardly due to the force of gravity of the same. To absolutely insure this result the screw 58 carries the cotter pin 65. At a proper point in its outer rotation the cotter pin 65 impinges against the inner surface of the flange 52 of the cap 51. Continued downward rotation of the screw 58 results in the force which tends to open the valve 12.

To remove the filtering element 9 for the purpose of cleaning, repair, inspection or for any other reason a procedure is followed generally similar to that in the removal of the receptacle 37. The nut 42' is turned outwardly. This creates a room for play for the collar 45'. The locking device 10 is now in a loosened condition. The member 38' is then rotated about the pivot points 40 and the locking device 10 assumes the position shown in Figure 8. The filter element 9 can now be withdrawn for any purpose desired.

To replace the filter element the above outlined steps are reversed. The filter element is replaced. The element 38' is swung into its proper locking position shown in Figures 1 and 2. The nut 42' is rotated inwardly. This forces the collar 45' against the plate 34 of the filter unit 9 firmly locking the same. In the locked position the inner end of the collar 45' encompasses the tubular member 35. This while not absolutely necessary is desirable since it acts as a positive guide and serves to hold the locking member 10 against lateral displacement due to vibration or even direct lateral pressure.

Should it become necessary to operate the automotive vehicle without a filter element, as for instance when the filter element becomes clogged and the operator does not have a replacing part, one need only place a gasket over the opening 27 and lock the same in place.

It is to be understood that the above disclosure is for the purpose of illustration only and not for the purpose of limitation since many changes may be made in the above disclosure without departing from the spirit of my invention. For instance, the shape of the casing 8 might be changed: Or the shape of any of the component members 17, 67, 18 and 19 might be changed: Or the casing may be cast as a unit, or cast in small subunits which are subsequently assembled by belting, welding or otherwise: Or the shape of the chambers 20, 23, 21 and 22 might be changed: Or the shape of the filter device may be changed: Or the type of filter device may be changed and any standard or special filtering medium may be substituted for the screen medium 32: Or the shape of the valve 12 may be changed: Or the type of valves may be changed and some standard or special valve substituted for the valve 12: Or the shape or type of container may be changed: Or the material of the container or any of the component parts of the device may be changed: The manner of attachment and form of the locking devices 10, 11 and 13 may be changed: Or the container 37 may be omitted entirely: Or the container 37 may be omitted and a second valve substituted in its stead.

Each and all of these changes as well as others not herein mentioned would come within the scope of this invention since the inventor does not desire to limit himself, except as limited by the claims hereto appended, to the shape of any of the parts or the device as a whole, to the material from which any of the parts are made, the type of valve used, the type of filter device used, the type, size and point of attachment of the locking means used, any particular manner of attachment or attaching means used to connect the filter device with the remainder of the automotive system, any particular point in the automotive system at which the filter device may be attached, or any manner of constructing the casing.

The term "automotive mechanism" as used in the claims and specifications is used to denote broadly a mechanism which has an engine or equivalent active unit which by its motion imparts motion to the remainder of the system. Examples of such a mechanism are an automobile, aeroplane, motor boat and a stationary engine driving any mechanism.

Having described my invention what I claim as new and useful is:—

1. A filter device for automotive vehicles consisting of a hollow casing, adapted to permit the free flow of fluid therethrough; filter means removably carried by the said casing for impounding the removing foreign insoluble substances carried by the said fluid; locking means carried by the said casing and cooperating with the said filter means to lock the same in place; a container removably carried by the said casing, the said container being adapted to receive the said foreign substances impounded by the said filter means; a second locking means carried by the said casing, the said second locking means cooperating with the said container to lock the same in operative position; each said locking means consisting of a swinging member carried by the said casing, a threaded bearing member carried by the said swinging member, a movable collar carried by the said threaded bearing member and a fastening member carried by the said threaded bearing member, the said fastening member being adapted to firmly hold each said collar of each said locking mechanism against the filter device and container respectively.

2. A filter device for automotive vehicles consisting of a hollow casing, adapted to permit the free flow of fluid therethrough; filter means removably carried by the said casing for impounding and removing foreign insoluble substances carried by the said fluid; locking means carried by the said casing and cooperating with the said filter means to lock the same in place; a container removably carried by the said casing, the said container being adapted to receive the said foreign substances impounded by the said filter means; a second locking means carried by the said casing, the said second locking means cooperating with the said container to lock the same in operative position; each said locking means consisting of a swinging member carried by the said casing, a threaded bearing member carried by the said swinging member, a movable collar carried by the said threaded bearing member; a fastening member carried by the said threaded bearing member, the said fastening member being adapted to firmly hold each said collar of each said locking mechanism against the filter device and container respectively; a swinging valve intermediate the said container and the remainder of the said casing for separating the said container from the remainder of the said casing, and a third locking means carried by the said casing, the said third locking means cooperating with the said swinging valve to operatively actuate and close the said valve.

3. A filter device for automotive mechanisms consisting of a hollow casing, adapted to permit the free flow of fluid therethrough; filter means removably carried by the said casing for impounding and removing foreign insoluble substances carried by the said fluid; locking means carried by the said casing and cooperating with the said filter means to lock the same in place; a container removably carried by the said casing, the said container being adapted to receive the said foreign substances impounded by the said filter means; a second locking means carried by the said casing, the said second locking means cooperating with the said container to lock the same in operative position; each said locking means consisting of a swinging member carried by the said casing, a threaded bearing member carried by the said swinging member, a movable collar carried by the said threaded bearing member; a fastening member carried by the said threaded bearing member, the said fastening member being adapted to firmly hold each said collar of each said locking mechanism against the filter device and container respectively; a swinging valve intermediate the said container and the remainder of the said casing for separating the said container from the remainder of the said casing, and a screw rotatably mounted in the said casing, for contacting movement with the said swinging valve for the purpose of actuating the same.

4. A filter device for the fluid system of an automotive mechanism consisting of a hollow casing, adapted to permit the free flow of liquid therethrough; an opening in the said casing for the insertion of a filter means; filter means removably carried by the said casing for filtering and impounding foreign soluble substance carried by the said fluid; the said means consisting of a screen, a reinforcing strip surrounding the said screen, a flat plate at the outer end of the said screen, a gasket carried by the inner face of the said flat plate and a locking flange carried on the outer face of the said flat plate; locking means for locking the said screen in operative position, the said locking means consisting of a swinging member carried by the said casing, a screw movably carried by the said swinging member, a collar movably mounted on the said screw and a nut mounted on the said collar, the said nut being adapted to actuate the said collar and lock the same in position; means for locking the said collar against rotary motion; the said means consisting of a slot formed in the said collar and a portion of the said rotatable member extending through the said slot; means for locking the said locking device against lateral motion, the said means consisting of the said locking flange carried by the said plate of the said filter device and the said movable collar carried by the said locking means; a tubular arm projecting from the said casing; a flange formed in the lower portion of the said tubular arm; a gasket carried by the said flange; a container removably carried by the said tubular arm, the upper part of the said container being adapted to contact with the said gasket; locking means to lock the said container in operative position carried by the said tubular arm, the said locking means consisting of a swinging element carried by the said tubular means; a screw slidably carried by the said swinging element; a collar slidably mounted on the said screw; a nut mounted on the said screw, the said nut adapted to actuate the said collar and to lock the same in operative position with the said container; means locking the said collar against rotary motion, the said means consisting of a slot formed in the said collar and a portion of the said rotatable means extending through the said slot; a second internal flange carried by the said tubular arm; a pair of studs carried by the said tubular arm; a valve cap rotatably mounted on the said stud, the said valve cap consisting of a main flange, a gasket mounted on the said main flange, a secondary flange and an opening formed in the said secondary flange; means for opening and closing the said valve, the said means consisting of a stuffing box carried by the said tubular arm, a screw mounted in the said stuffing box and projecting through the said opening formed in the second flange of the said valve cap and a cotter pin carried by the said screw; arms formed on the said casing, the said arms adapting the said casing to be connected into the said fluid system; lugs formed in the said casing, the said lugs acting as guides; and retaining means for the said filter element.

In testimony whereof I hereby affix my signature.

JOSEPH RENDELMAN.